(12) United States Patent
Ferranti

(10) Patent No.: US 7,467,988 B2
(45) Date of Patent: *Dec. 23, 2008

(54) SLURRY COMPOSITION AND METHOD FOR POLISHING ORGANIC POLYMER-BASED OPHTHALMIC SUBSTRATES

(75) Inventor: Steven A. Ferranti, Rochester, NY (US)

(73) Assignee: Ferro Corporation, Cleveland, OH (US)

( * ) Notice: Subject to any disclaimer, the term of this patent is extended or adjusted under 35 U.S.C. 154(b) by 38 days.

This patent is subject to a terminal disclaimer.

(21) Appl. No.: 11/689,543

(22) Filed: Mar. 22, 2007

(65) Prior Publication Data

US 2007/0190910 A1   Aug. 16, 2007

Related U.S. Application Data

(63) Continuation-in-part of application No. 11/102,555, filed on Apr. 8, 2005, now Pat. No. 7,294,044.

(51) Int. Cl.
B24B 1/00 (2006.01)
(52) U.S. Cl. .............. 451/42; 451/60; 51/298
(58) Field of Classification Search ............ 451/41, 451/42, 60; 51/298
See application file for complete search history.

(56) References Cited

U.S. PATENT DOCUMENTS

| | | | |
|---|---|---|---|
| 4,127,697 A | 11/1978 | Laurin | |
| 4,135,792 A | 1/1979 | Deeg et al. | |
| 4,139,694 A | 2/1979 | Laliberte | |
| 4,222,747 A | 9/1980 | Dauguet et al. | |
| 4,225,349 A | 9/1980 | Koshiyama et al. | |
| 4,376,751 A | 3/1983 | Duchane | |
| 4,443,588 A | 4/1984 | Fukuda et al. | |
| 4,627,950 A * | 12/1986 | Matsui et al. | 264/103 |
| 4,769,073 A | 9/1988 | Tastu et al. | |
| 4,859,719 A | 8/1989 | Ofstead | |
| 6,468,911 B1 * | 10/2002 | Miyashita et al. | 438/692 |
| 6,530,824 B2 * | 3/2003 | Thomas et al. | 451/41 |
| 6,638,326 B2 | 10/2003 | Small et al. | |
| 6,786,945 B2 | 9/2004 | Machii et al. | |
| 6,802,878 B1 | 10/2004 | Monroe | |
| 6,818,031 B2 | 11/2004 | Oshima | |
| 6,821,897 B2 | 11/2004 | Schroeder et al. | |
| 6,916,742 B2 | 7/2005 | Ye et al. | |
| 2002/0039839 A1 * | 4/2002 | Thomas et al. | 438/693 |
| 2004/0194392 A1 | 10/2004 | Takemiya et al. | |
| 2004/0221516 A1 | 11/2004 | Cho et al. | |
| 2005/0194358 A1 | 9/2005 | Chelle | |
| 2005/0263490 A1 | 12/2005 | Liu et al. | |
| 2006/0216935 A1 | 9/2006 | Oswald et al. | |

OTHER PUBLICATIONS

Essilor International, Opthalmic Optics Files: Materials, Mar. 1997.

* cited by examiner

*Primary Examiner*—Maurina Rachuba
(74) *Attorney, Agent, or Firm*—Rankin, Hill & Clark LLP

(57) ABSTRACT

The present invention provides a slurry composition and method for polishing organic polymer-based ophthalmic substrates. The slurry composition according to the invention includes an aqueous dispersion of abrasive particles and a pyrrolidone compound. The abrasive particles can be alumina, zirconia, silica, titania or combinations of the foregoing. Slurry compositions according to the invention can be used to polish all types of organic polymer-based ophthalmic substrates, but are particularly useful for polishing organic polymer-based ophthalmic substrates having an index of refraction greater than 1.498 because they remove such materials at a greater efficiency than conventional slurry compositions without detrimentally affecting the quality of the resulting surface.

13 Claims, No Drawings

SLURRY COMPOSITION AND METHOD FOR POLISHING ORGANIC POLYMER-BASED OPHTHALMIC SUBSTRATES

CROSS-REFERENCE TO RELATED APPLICATIONS

This application is a continuation-in-part of application Ser. No. 11/102,555, filed Apr. 8, 2005.

BACKGROUND OF INVENTION

1. Field of Invention

The present invention relates to a slurry composition and method for polishing organic polymer-based ophthalmic substrates.

2. Description of Related Art

A variety of slurry compositions are known in the art for use in polishing organic polymer-based ophthalmic substrates. Such prior art slurry compositions generally consist of abrasive particles dispersed in deionized water and/or other liquids. Commonly utilized abrasive particles include, for example, cerium oxide, aluminum oxide, zirconium oxide, tin oxide, silicon dioxide and titanium oxide. Aluminum oxide slurry is most commonly used for polishing organic polymer-based ophthalmic substrates such as, for example, allyl diglycol carbonate polymer, which is commonly known in the art as CR-39, and other higher index of refraction polycarbonate resins.

Slurry compositions consisting solely of aluminum oxide abrasive particles dispersed in deionized water produce acceptable surface quality when used to polish organic polymer-based ophthalmic substrates, but exhibit unacceptably low polishing efficiency (i.e., a low removal rate). The polishing efficiency of such slurry compositions can be improved by using significantly larger aluminum oxide particles, but the use of larger particles results in unsatisfactory surface quality (i.e. scratches, pit marks, orange peel or like defects).

Koshiyama et al., U.S. Pat. No. 4,225,349, disclose a polishing composition consisting of calcined alumina (aluminum oxide particles) and an aluminum salt polishing accelerator dispersed in deionized water that accelerates the removal of the CR-39 substrate material without degrading the surface quality. The preferred polishing accelerator identified by Koshiyama et al. is aluminum nitrate.

CR-39, which has an index of refraction of about 1.498, has dominated the market for organic polymer-based ophthalmic substrates for many years. In recent years, however, higher index of refraction organic polymer-based ophthalmic substrates have been developed, and these higher index of refraction substrates are becoming more prevalent in the ophthalmic lens market. The higher index of refraction substrates provide several distinct advantages over CR-39 in ophthalmic lens applications. For example lenses that are fabricated from 1.586 index of refraction polycarbonate substrates are thinner and lighter in weight than comparable lenses fabricated from CR-39, and further provide improved impact resistance. This makes polycarbonate-based ophthalmic substrates more suitable for use in fabricating eyewear worn by children, active adults and in the production of safety glasses. Generally speaking, the higher the index of refraction, the thinner and lighter the ophthalmic lens. Higher index of refraction organic polymer-based ophthalmic substrates allow for the fabrication of eyewear that is functional and fashionable, and which eliminates the "bulbous" or thick "coke-bottle" look often found with lower index of refraction lenses.

Known slurry compositions for use in polishing CR-39 do not provide the desired polishing efficiency, even when a conventional accelerator such as aluminum nitrate is present. A slurry composition that provides high removal efficiency, particularly on higher index of refraction organic polymer-based ophthalmic substrates, is desired.

BRIEF SUMMARY OF THE INVENTION

The present invention provides a slurry composition and method for polishing organic polymer-based ophthalmic substrates. The slurry composition and method of the invention polishes high index polymer-based ophthalmic substrates with greater polishing efficiency and surface quality than can be achieved with conventional slurry compositions. A slurry composition according to the invention comprises an aqueous dispersion of abrasive particles and a pyrrolidone compound. The abrasive particles can be alumina, zirconia, silica, titania or combinations of the foregoing. Slurry compositions according to the invention can be used to polish all types of organic polymer-based ophthalmic substrates, but are particularly useful for polishing organic polymer-based ophthalmic substrates having an index of refraction greater than 1.498 because they remove such materials at a greater efficiency than conventional slurry compositions without detrimentally affecting the quality of the resulting surface.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Throughout the instant specification and in the appended claims, the phrase "organic polymer-based ophthalmic substrates" refers to organic thermosetting or thermoplastic polymer materials used in the fabrication of eyeglass lenses and other optometric devices. Included within this definition are polycarbonate materials such as allyl diglycol carbonate polymers commonly known as CR-39 and other thermosetting and thermoplastic organic polymer resins used to fabricate ophthalmic lenses. Specifically excluded from this definition are inorganic glasses and inorganic crystal based substrates. The phrase "high index organic polymer-based ophthalmic substrates" refers to those organic polymer-based ophthalmic substrates that have an index of refraction greater than 1.498, which is the index of refraction for the allyl diglycol carbonate polymer known in the art as CR-39. Most manufacturers of organic polymer-based ophthalmic substrates regard the specific composition of their ophthalmic substrate materials as proprietary information. Applicants do not have knowledge of the specific compositions of such materials, but generally know that such substrates belong to polymer families such as polycarbonates, polyurethanes, polyesters including polyacrylates and epoxies, polyacrylamides and polysulfones. These organic polymer families may be homopolymers or copolymers, and many are cross-linked and/or co-polymerized with other organic and inorganic compounds. Most are thermocast.

Slurry compositions according to the present invention can be used to polish all organic polymer-based ophthalmic substrates, but are particularly suitable for use in polishing high index organic polymer-based ophthalmic substrates. As shown in the accompanying Examples, slurry compositions according to the invention provide greater polishing efficiency on high index organic polymer-based ophthalmic substrates than convention slurry compositions. Furthermore, slurry compositions according to the invention provide similar, if not improved, polishing efficiencies on traditional polycarbonate materials such as CR-39. In all applications, slurry compositions according to the invention provide acceptable surface quality.

Slurry compositions according to the present invention preferably comprise an aqueous dispersion comprising abrasive particles and a pyrrolidone compound. The abrasive particles must be selected from the group consisting of alumina, zirconia, silica, titania and combinations of the foregoing. It will be appreciated that the abrasive particles can be doped with or contain small amounts of other elements. Abrasives are typically produced by high temperature calcination, but can be produced by other methods. Calcined alumina abrasive particles are presently most preferred for use in the invention.

The abrasive particles used in the invention preferably have a particle size within the range of from about 0.01 µm to about 4.0 µm, more preferably within the range of from about 0.05 µm to about 2.5 µm, and most preferably within the range of from about 1.0 µm to about 2.5 µm. The abrasive particles preferably comprise from about 5% to about 40% of the slurry composition by weight, and more preferably within the range of from about 10% to about 30% of the slurry composition by weight.

A preferred pyrrolidone compound for use in the invention is polyvinyl pyrrolidone ("PVP"). Preferably, the weight average molecular weight of the PVP used in the slurry composition according to the invention is within the range of from about 3,000 to about 60,000, and more preferably from about 10,000 to about 50,000. PVP with a weight average molecular weight within these ranges is readily available from a variety of chemical suppliers.

It will be appreciated that the pyrrolidone compound need not be PVP. Other pyrrolidone compounds, such as N-octyl-2-pyrrolidone, N-dodecyl-2-pyrrolidone, N-methyl-2-pyrrolidone, N-ethyl-2-pyrrolidone, N-hydroxyethyl-2-pyrrolidone, N-cyclohexyl-2-pyrrolidone, N-butyl-2-pyrrolidone, N-hexyl-2-pyrrolidone, N-decyl-2-pyrrolidone, N-octadecyl-2-pyrrolidone, N-hexadecyl-2-pyrrolidone and copolymers of polyvinyl pyrrolidone, and combinations of the foregoing can also be used. Polyvinyl caprolactam can be used as an alternative to a pyrrolidone compound.

The pyrrolidone compound is preferably present in the slurry composition at a loading of from about 0.025% to about 5% by weight, and more preferably from about 0.15% to about 4.0% by weight. The effectiveness of the pyrrolidone compound in increasing the removal efficiency of high index organic polymer-based ophthalmic substrates is not diminished when conventional accelerators such as aluminum nitrate are also present.

Aluminum nitrate is a known polishing efficiency accelerator for use on 1.498 Index substrates. Aluminum nitrate can be used in slurry compositions according to the invention without adversely degrading the efficiency improvements provided on high index organic polymer-based ophthalmic substrates. When aluminum nitrate is used in a slurry composition according to the invention, it is present in an amount preferably within the range of from about 0.25% to 4.0% by weight, and more preferably from about 0.5% to about 3.0% by weight.

As is well known in the art, colloidal aluminum hydroxide can be used as a suspending agent for alumina abrasive particles. When present, the colloidal aluminum hydroxide comprises from about 0.49% to about 1.47% by weight of the slurry, and more preferably, 0.735% to about 1.225% by weight of the slurry.

Preferably, an anti-foaming agent such as modified siloxane treated fumed silica is also used. Anti-foaming agents of this type are well known in the art, and can be acquired from a variety of vendors. Anti-foaming agents are typically present in an amount from about 0.025% to about 0.30% by weight, and more preferably from about 0.025% to about 0.10% by weight.

The slurry composition according to the present invention is preferably aqueous in nature, meaning that the individual components of the slurry are dispersed in deionized water. However, other liquid polishing media can be used.

It will be appreciated that surfactants, biocides, pH modifiers, pH buffers, rheology modifiers and other compounds can also be present in the slurry composition provided they do not adversely react with the abrasive particles and/or the pyrrolidone compound and thereby adversely affect the efficiency of the polishing slurry, or detrimentally affect the final surface quality produced via polishing.

It will be appreciated that the slurry composition can be shipped and stored in the form of a dry powder or concentrated aqueous paste, which can be readily dispersed in water with a minimum of mixing in order to prepare an aqueous polishing slurry for polishing organic polymer-based ophthalmic substrates. Thus, the invention further provides a dry powder composition that can be dispersed in water to form an aqueous polishing slurry, and a method of polishing an organic polymer-based ophthalmic substrate comprising dispersing a composition comprising abrasive particles selected from the group consisting of alumina, zirconia, silica and titania and a pyrrolidone compound and/or polyvinyl caprolactam in water to form an aqueous polishing slurry, disposing the aqueous polishing slurry between a polishing pad and the organic polymer-based ophthalmic substrate, and polishing the organic polymer-based ophthalmic substrate with the polishing pad and the aqueous polishing slurry to remove a surface portion of the organic polymer-based ophthalmic substrate.

The following examples are intended only to illustrate the invention and should not be construed as imposing limitations upon the claims.

EXAMPLES

In the following examples, unless otherwise stated, the term "Alumina" refers to calcined aluminum oxide having an average particle size of about 1.0 pm to about 2.5 pm. The term "Aluminum Hydroxide" refers to colloidal aluminum hydroxide (~90 nm Boehmite) dispersed in water, but is reported in the tables as a dry weight equivalent. The term "Aluminum Nitrate" refers to a solution of aluminum nitrate dissolved in water, but is reported in the tables as a dry weight equivalent. The term "Antifoam" refers to a modified siloxane treated fumed silica. The term "PVP-3,500 Mw" refers to a polyvinyl pyrrolidone polymer having a weight average molecular weight of about 3,500. The term "PVP-10,000 Mw" refers to a polyvinyl pyrrolidone polymer having a weight average molecular weight of about 10,000. The term "PVP-29,000 Mw" refers to a polyvinyl pyrrolidone polymer having a weight average molecular weight of about 29,000. The term "PVP-55,000 Mw" refers to a polyvinyl pyrrolidone polymer having a weight average molecular weight of about 55,000.

The organic polymer-based ophthalmic substrates tested in the following examples are referred to by their refractive index. The specific compositions of the organic polymer-based ophthalmic substrates are regarded as proprietary by the manufacturers, and are not known by applicant. The term "1.498 Index" refers to an organic polymer-based ophthalmic substrate (believed to comprise an allyl diglycol carbonate polymer), which can be obtained from Essilor of America, Inc. of Petersburg, Fla. as CR-39. The term "1.55 Index" refers to an organic polymer-based ophthalmic substrate (believed to comprise vinyl allyl ester oligomers), which can be obtained from Younger Optics of Torrance, Calif., and is available commercially as EASY-LITE 1.55. The term "1.586 Index" refers to an organic polymer-based ophthalmic substrate (believed to comprise a polycarbonate polymer), which can also be obtained from Essilor of America, Inc. The term "1.60 Index" refers to an organic polymer-based ophthalmic substrate (believed to comprise a blend of polyurethane polymer and sulfur), which can be obtained from the Silor Division of Essilor of America, Inc. as available as THIN & LITE 1.60. The term "1.74 Index" refers to an organic polymer-based ophthalmic substrate (believed to comprise a polyurethane/sulfur blend or a polyurethane/polysulfone blend), which can be obtained from Miki & Co., Ltd. of Tokyo, Japan as 1.74 HI INDEX.

Example 1

Slurries 1A through 1E were each separately formed by mixing together the amounts of the Components shown in weight percent in Table 1. After the slurries were formulated, measurements of the pH and the viscosity were made, and the data is reported in Table 1 below. A fresh amount of each slurry formulation was used to polish the organic polymer-based ophthalmic substrates listed in the "REMOVAL RATE" section of Table 1. The organic polymer-based ophthalmic substrates were separately polished on a Coburn 505 Optical Polisher equipped with a bowl type slurry reservoir. The polishing pad was a SHAWSHEEN 349-7 Premium Grade Yellow Polishing Pad obtained from PSI of Odessa, Fla. The Optical Polisher machine settings were 20.0 psi pressure and 742 RPM. The reservoir was equipped with a small recirculating pump. The slurry reservoir was charged with a fresh two thousand gram supply of slurry for each polishing test. The slurry was recirculated at a flow rate of 4.54 liters/minute. The slurry was chilled throughout each polishing experiment to a temperature range of 10 to 15° C. The substrates were not fined between polishing cycles. Polishing efficiency was determined by measuring the weight loss of each substrate after each polishing cycle and is reported in Table 1 as weight loss in milligrams per 6-minute cycle. The weight loss values reported in Table 1 were obtained via polishing each substrate three times, and then averaging the weight loss for the three polishing cycles.

TABLE 1

|  | Slurry 1A | Slurry 1B | Slurry 1C | Slurry 1D | Slurry 1E |
|---|---|---|---|---|---|
| COMPONENTS: |  |  |  |  |  |
| Deionized Water | 89.95 | 87.79 | 89.45 | 89.45 | 89.45 |
| Alumina | 10.00 | 10.00 | 10.00 | 10.00 | 10.00 |
| Antifoam | 0.05 | 0.05 | 0.05 | 0.05 | 0.05 |
| Aluminum Nitrate | — | 2.16 | — | — | — |
| PVP - 10,000 $M_w$ | — | — | 0.50 | — | — |
| PVP - 3,500 $M_w$ | — | — | — | 0.50 | — |
| PVP - 55,000 $M_w$ | — | — | — | — | 0.50 |

TABLE 1-continued

|  | Slurry 1A | Slurry 1B | Slurry 1C | Slurry 1D | Slurry 1E |
|---|---|---|---|---|---|
| PHYSICAL DATA: |  |  |  |  |  |
| pH | 10.04 | 3.64 | 9.89 | 9.96 | 9.88 |
| Viscosity (cps) | 3.40 | 3.90 | 22.60 | 37.50 | 24.80 |
| REMOVAL RATE: |  |  |  |  |  |
| 1.498 Index (mg/6 min) | 98 | 138 | 104 | 58 | 63 |
| 1.586 Index (mg/6 min) | 36 | 43 | 53 | 62 | 68 |
| 1.55 Index (mg/6 min) | 147 | 186 | 257 | 230 | 242 |
| 1.60 Index (mg/6 min) | 81 | 87 | 131 | 111 | 107 |
| 1.74 Index (mg/6 min) | 108 | 150 | 280 | 274 | 255 |

Slurries 1C, 1D and 1E, which included 0.5% by weight of a polyvinyl pyrrolidone exhibited an increased polishing efficiency as compared to Slurry 1A, which did not contain any polyvinyl pyrrolidone and Slurry B, which contained a conventional loading of a known alumina polishing rate accelerator, aluminum nitrate. Slurries 1C, 1D and 1E also demonstrate that the increase in polishing efficiency occurs using various molecular weights of polyvinyl pyrrolidone.

Example 2

Slurries 1F through 1I were each separately formed by mixing together the amounts of the Components shown in weight percent in Table 2. After the slurries were formulated, measurements of the pH and the viscosity were made, and the data is reported in Table 2 below. A fresh amount of each slurry formulation was used to polish the organic polymer-based ophthalmic substrates using the same procedures and polishing equipment as described in Example 1. The polishing rate removal efficiency is reported in Table 2 below:

TABLE 2

|  | Slurry 1A | Slurry 1B | Slurry 1F | Slurry 1G | Slurry 1H | Slurry 1I |
|---|---|---|---|---|---|---|
| COMPONENTS: |  |  |  |  |  |  |
| Deionized Water | 89.95 | 87.84 | 89.925 | 89.80 | 87.95 | 85.95 |
| Alumina | 10.00 | 10.00 | 10.00 | 10.00 | 10.00 | 10.00 |
| Antifoam | 0.05 | 0.05 | 0.05 | 0.05 | 0.05 | 0.05 |
| Aluminum Nitrate | — | 2.16 | — | — | — | — |
| PVP - 10,000 $M_w$ | — | — | 0.025 | 0.15 | 2.00 | 4.00 |
| PHYSICAL DATA: |  |  |  |  |  |  |
| pH | 10.04 | 3.64 | 9.13 | X | 6.87 | 5.99 |
| Viscosity (cps) | 3.40 | 3.90 | 26.90 | X | 3.40 | 2.90 |
| REMOVAL RATE: |  |  |  |  |  |  |
| 1.498 Index (mg/6 min) | 98 | 138 | 59 | X | 77 | 109 |
| 1.586 Index (mg/6 min) | 36 | 43 | 58 | X | 56 | 59 |
| 1.55 Index (mg/6 min) | 147 | 186 | 155 | 223 | 275 | 309 |
| 1.60 Index (mg/6 min) | 81 | 87 | 59 | 113 | 136 | 155 |
| 1.74 Index (mg/6 min) | 108 | 150 | 172 | X | 219 | 227 |

"X" means that no test data is available

In Slurry 1F, a 0.025 weight percent loading of a 10,000 weight average molecular weight polyvinyl pyrrolidone showed a modest increase in polishing efficiency for 1.586 Index and 1.74 Index substrates, respectively, as compared to the polishing efficiencies obtained in Example 1 for Slurries 1A and 1B. However, at this loading, no increase in polishing efficiency was obtained for the 1.55 Index and 1.60 Index substrate. In Slurry, 1G, the polyvinyl pyrrolidone loading was increased to 0.15 weight percent. Slurry 1G was used to polish substrates 1.55 Index and 1.60 Index only, and was shown to increase the polishing efficiency for such substrates. Slurries 1G, 1H and 1I each demonstrated a higher rate of polishing efficiency for all substrates with an index of refraction greater than 1.498.

Example 3

Slurries 2A, 2B and 2C were each separately formed by mixing together the amounts of the Components shown in weight percent in Table 3. After the slurries were formulated, measurements of the pH and the viscosity were made, and the data is reported in Table 3 below. A fresh amount of each slurry formulation was used to polish the organic polymer-based ophthalmic substrates using the same procedures and polishing equipment as described in Example 1. The polishing rate removal efficiency is reported in Table 3 below:

TABLE 3

|  | Slurry 2A | Slurry 2B | Slurry 2C |
| --- | --- | --- | --- |
| COMPONENTS: |  |  |  |
| Deionized Water | 79.95 | 77.79 | 79.45 |
| Alumina | 20.00 | 20.00 | 20.00 |
| Antifoam | 0.05 | 0.05 | 0.05 |
| Aluminum Nitrate | — | 2.16 | — |
| PVP - 29,000 $M_w$ | — | — | 0.50 |
| PHYSICAL DATA: |  |  |  |
| pH | 10.35 | 3.70 | 9.88 |
| Viscosity (cps) | 19.00 | 6.40 | 146.50 |
| REMOVAL RATE: |  |  |  |
| 1.498 Index (mg/6 min) | 129 | 181 | 129 |
| 1.586 Index (mg/6 min) | 47 | 61 | 69 |
| 1.55 Index (mg/6 min) | 236 | 269 | 297 |
| 1.60 Index (mg/6 min) | 108 | 131 | 150 |

Example Slurry 2C, which contains a polyvinyl pyrrolidone, clearly demonstrates the increased polishing efficiency obtained for substrates with an index of refraction greater than 1.498 as compared to Slurry 2A, which contained no polishing accelerator, and Slurry 2B, which contained a conventional loading of a conventional aluminum nitrate polishing rate accelerator.

Example 4

Slurries 3A, 3B and 3C were each separately formed by mixing together the amounts of the Components shown in weight percent in Table 4. After the slurries were formulated, measurements of the pH and the viscosity were made, and the data is reported in Table 4 below. A fresh amount of each slurry formulation was used to polish the organic polymer-based ophthalmic substrates using the same procedures and polishing equipment as described in Example 1. The polishing rate removal efficiency is reported in Table 4 below:

TABLE 4

|  | Slurry 3A | Slurry 3B | Slurry 3C |
| --- | --- | --- | --- |
| COMPONENTS: |  |  |  |
| Deionized Water | 69.95 | 67.79 | 69.45 |
| Alumina | 30.00 | 30.00 | 30.00 |
| Antifoam | 0.05 | 0.05 | 0.05 |
| Aluminum Nitrate | — | 2.16 | — |
| PVP - 29,000 $M_w$ | — | — | 0.50 |
| PHYSICAL DATA: |  |  |  |
| pH | 10.13 | 3.69 | 10.35 |
| Viscosity (cps) | 747.80 | 7.80 | 105.00 |
| REMOVAL RATE: |  |  |  |
| 1.498 Index (mg/6 min) | 148 | 188 | 153 |
| 1.586 Index (mg/6 min) | 42 | 65 | 72 |
| 1.55 Index (mg/6 min) | 284 | 309 | 349 |
| 1.60 Index (mg/6 min) | 129 | 147 | 182 |

Example Slurry 3C, which contains a polyvinyl pyrrolidone, clearly demonstrates the increased polishing efficiency obtained for substrates with an index of refraction greater than 1.498 as compared to Slurry 3A, which contained no polishing accelerator, and Slurry 3B, which contained a conventional Aluminum Nitrate polishing rate accelerator.

Example 5

Slurries 4A and 4B were each separately formed by mixing together the amounts of the Components shown in weight percent in Table 5. After the slurries were formulated, measurements of the pH and the viscosity were made, and the data is reported in Table 5 below.

TABLE 5

|  | Slurry 4A | Slurry 4B |
| --- | --- | --- |
| COMPONENTS: |  |  |
| Deionized Water | 80.11 | 80.61 |
| Alumina | 16.50 | 16.50 |
| Aluminum Nitrate | 1.98 | 1.98 |
| Aluminum Hydroxide | 0.86 | 0.86 |
| PVP - 10,000 $M_w$ | 0.50 | — |
| Antifoam | 0.05 | 0.05 |
| PHYSICAL DATA: |  |  |
| pH | 3.58 | 3.64 |
| Viscosity (cps) | 42.0 | 31.9 |

Slurry 4A, Slurry 4B (a non-PVP containing control slurry) and a conventional plastic lens polishing slurry commercially available as PRAXAIR H-A1 (pH 3.3; viscosity 50+ cps), were each separately used to polish "1.498 Index" and "1.586 Index" substrates (lenses). All lenses were polished on a LOH Optical TORO-X2 Polisher. The polishing pad was a SHAW-SHEEN 349-7 Premium Grade Yellow Polishing Pad obtained from PSI of Odessa, Fla. The machine settings were 0.35 bar pressure and 908 RPM. Four thousand grams of slurry were used for each experiment. Each slurry was contained in a two-gallon container equipped with a high-speed agitator/pump that was used to recirculate the slurry through the polishing chamber and back into the slurry containment vessel. The slurry was recirculated at a flow rate of 1.0 gallon per minute. The slurry was chilled throughout each polishing experiment to a temperature range of 10-15° C. Additional polishing slurry was not added between cycles to make up for any slurry loss due to polish drag out. Polishing efficiency was determined by measuring the average weight loss of each pair of lenses after each polishing cycle and is reported in Table 6 as mg loss per 6-minute cycle. Each slurry was evaluated by polishing ten pairs each of 1.498 Index and 1.586 Index lenses. Polishing cycles alternated between 1.498 Index substrates and 1.586 Index substrates. The substrates were not fined between polishing cycles.

TABLE 6

|  | 1.498 Index | | | 1.586 index | | |
| --- | --- | --- | --- | --- | --- | --- |
|  | Slurry 4A | Slurry 4B | Praxair H-A1 | Slurry 4A | Slurry 4B | Praxair H-A1 |
| Cycle 1 | 175 | 155 | 150 | 79 | 52 | 60 |
| Cycle 2 | 177 | 155 | 128 | 73 | 49 | 64 |
| Cycle 3 | 180 | 168 | 126 | 77 | 54 | 60 |
| Cycle 4 | 178 | 163 | 129 | 72 | 59 | 56 |
| Cycle 5 | 178 | 166 | 126 | 69 | 56 | 58 |
| Cycle 6 | 179 | 167 | 128 | 72 | 56 | 62 |
| Cycle 7 | 183 | 168 | 127 | 76 | 56 | 59 |
| Cycle 8 | 175 | 160 | 122 | 71 | 51 | 60 |
| Cycle 9 | 172 | 164 | 124 | 68 | 58 | 59 |
| Cycle 10 | 179 | 162 | 126 | 74 | 54 | 57 |

Example 5 demonstrates that Slurry A, which contained a pyrrolidone compound, consistently exhibited a higher polishing efficiency than either comparison Slurry B (same formulation, except no PVP) and the commercially available plastic lens polishing slurry, and did so for both the 1.498 Index and 1.586 Index substrates.

Example 6

Slurry 4C was formed by mixing together the amounts of the components shown in weight percent in Table 7 below:

TABLE 7

| Components | Weight % |
| --- | --- |
| Deionized Water | 80.60 |
| Alumina | 16.00 |
| Aluminum Nitrate | 1.98 |
| Aluminum Hydroxide | 0.86 |
| PVP- 10,000 Mw | 0.50 |
| Antifoam | 0.05 |

Slurry 4C was then dried to a powder and redispersed in deionized water to form the reconstituted slurry 4D. The pH and viscosity of slurry 4D were measured and the results are reported in Table 8.

TABLE 8

| Physical Data | |
| --- | --- |
| pH | 4.4 |
| Viscosity (cps) | 3.4 |

The dry powder was formed by spray drying the slurry 4C with a Niro Mobile Minor Pilot Scale Spray Dryer. Drying of such slurry formulations is not limited to this method and can be achieved by other conventional means such as tray drying in a convection oven. The dry powder was redispersed in deionized water (711.6 g dry powder and 3288.4 g deionized water) to form the reconstituted slurry 4D. The powder can be easily dispersed with minimum agitation required. For amounts such as that described above simply combining the components in a gallon jug, capping the jug with a tight fitting lid and shaking for several minutes is sufficient to redisperse the powder into a useable polish. Larger batches of material can be combined in any suitable vessel and stirring the contents with a portable mixer such as a lab mixer or paint type mixer attached to a portable hand held drill. Larger batches can also be hand stirred with a large spatula or other similar stirring device. Water other than deionized water (i.e. tap water) can be used to redisperse the dried powder.

The incorporation of PVP (polyvinyl pyrrolidone) into the formulation facilitates the rapid and complete-dispersing of the powder. The mechanism for this rapid and complete redispersion of the dried powder is believed to be the result of PVP's ability to disintegrate dried powder agglomerates.

Example 7

Both slurries 4C and 4D were used to polish 1.498 Index, 1.586 Index, 1.55 Index, 1.60 Index, 1.67 Index and 1.74 Index substrates (lenses). All lenses were polished on a LOH Optical TORO-X2 polisher. The polishing pad was a SHAW-SHEEN 349-7 Premium Grade Yellow Polishing Pad obtained from PSI of Odessa, Fla. The machine settings were 0.35 bar pressure and 908 RPM. Four thousand grams of each slurry was used for this experiment. The slurry was contained in a two-gallon container equipped with a high-speed agitator/pump that was used to recirculate the slurry through the polishing chamber and back into the slurry containment vessel. The slurry was recirculated at a flow rate of 1.0 gallon per minute. The slurry was chilled throughout the polishing experiment to a temperature range of 10-15° C. Additional polishing slurry was not added between cycles to make up for any slurry loss due to polish drag out. The removal was determined by measuring the average weight loss of each pair of lenses during each polishing cycle and is reported in Table 9 as mg loss per 6-minute cycle. Each slurry was evaluated by polishing twelve pairs each of 1.498 Index and 1.586 Index lenses. Polishing cycles alternated between 1.498 Index substrates and 1.586 Index substrates. The substrates were not fined between polishing cycles. The removal data during each polishing cycle for these slurries are listed in Table 9. Indices of 1.55, 1.60, 1.67 and 1.74 lenses were only polished at polishing Cycle 1 and again at polishing Cycle 12 and the removals are listed in Table 10.

Example 7 demonstrates that reconstituted slurry 4D exhibited a comparable polishing rate performance to the original slurry 4C for lens substrates with indices higher than 1.498. The reconstituted slurry 4D did show a reduced polishing rate for 1.498 Index substrate when compared to polishing the original slurry 4C. Surface quality of all lenses polished with reconstituted slurry 4D showed no detrimental effects or reduction in surface quality when compared with the corresponding index lens polished with the original slurry 4C.

TABLE 9

| Polishing Cycle | 1.498 Index Reconstituted Slurry 4D | 1.498 Index Original Slurry 4C | 1.586 Index Reconstituted Powder 4D | 1.586 Index Original Slurry 4C |
| --- | --- | --- | --- | --- |
| 1 | 155 | 210 | 78 | 74 |
| 2 | 142 | 191 | 71 | 76 |
| 3 | 145 | 189 | 69 | 71 |
| 4 | 140 | 188 | 64 | 71 |
| 5 | 145 | 189 | 66 | 74 |

TABLE 9-continued

| Polishing Cycle | 1.498 Index Reconstituted Slurry 4D | 1.498 Index Original Slurry 4C | 1.586 Index Reconstituted Powder 4D | 1.586 Index Original Slurry 4C |
|---|---|---|---|---|
| 6 | 145 | 187 | 70 | 71 |
| 7 | 145 | 179 | 64 | 76 |
| 8 | 139 | 176 | 67 | 70 |
| 9 | 136 | 182 | 64 | 69 |
| 10 | 135 | 188 | 66 | 68 |
| 11 | 129 | 178 | 66 | 68 |
| 12 | 124 | 189 | 67 | 67 |

TABLE 10

| | 1.55 Index | 1.60 Index | 1.67 Index | 1.74 Index |
|---|---|---|---|---|
| Reconstituted Slurry 4D, Cycle 1 | 469 | 185 | 239 | 389 |
| Reconstituted Slurry 4D, Cycle 12 | 419 | 175 | 217 | 364 |
| Original Slurry 4C, Cycle 1 | 399 | 198 | 238 | 388 |
| Original Slurry 4C, Cycle 12 | 417 | 170 | 222 | 353 |

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A method of polishing an organic polymer-based ophthalmic substrate comprising:
   dispersing a composition comprising abrasive particles selected from the group consisting of alumina, zirconia, silica and titania and a pyrrolidone compound and/or polyvinyl caprolactam in water to form an aqueous polishing slurry;
   disposing the aqueous polishing slurry between a polishing pad and the organic polymer-based ophthalmic substrate; and
   polishing the organic polymer-based ophthalmic substrate with the polishing pad and the aqueous polishing slurry to remove a surface portion of the organic polymer-based ophthalmic substrate.

2. The method according to claim 1 wherein the organic polymer-based ophthalmic substrate is a high index organic polymer-based ophthalmic substrate.

3. The method according to claim 1 wherein the abrasive particles have an average particle size of from about 0.01 μm to about 4.0 μm.

4. The method according to claim 3 wherein the abrasive particles have an average particle size of from about 1.0 μm to about 2.5 μm.

5. The method according to claim 1 wherein the composition comprises a polyvinyl pyrrolidone having a weight average molecular weight of from about 3,000 to about 60,000.

6. The method according to claim 5 wherein the composition comprises a polyvinyl pyrrolidone having a weight average molecular weight of from about 10,000 to about 50,000.

7. The method according to claim 1 wherein the composition comprises a pyrrolidone compound and after the composition is dispersed in water, the pyrrolidone compound comprises from about 0.025% to about 5% of the aqueous polishing slurry by weight.

8. The method according to claim 7 wherein after the composition is dispersed in water, the pyrrolidone compound comprises from about 0.15% to about 4% of the aqueous polishing slurry composition by weight.

9. The method according to claim 1 wherein the composition comprises a pyrrolidone compound selected from the group consisting of N-octyl-2-pyrrolidone, N-dodecyl-2-pyrrolidone, N-methyl-2-pyrrolidone, N-ethyl-2-pyrrolidone, N-hydroxyethyl-2-pyrrolidone, N-cyclohexyl-2-pyrrolidone, N-butyl-2-pyrrolidone, N-hexyl-2-pyrrolidone, N-decyl-2-pyrrolidone, N-octadecyl-2-pyrrolidone, N-hexadecyl-2-pyrrolidone and copolymers of polyvinyl pyrrolidone, and combinations of the foregoing.

10. The method according to claim 1 wherein the abrasive particles consist essentially of alumina.

11. The method according to claim 10 wherein the composition comprises a polyvinyl pyrrolidone having a weight average molecular weight of from about 10,000 to about 50,000.

12. The method according to claim 1 wherein the composition is in the form of a dry powder before it is dispersed in water.

13. The method according to claim 1 wherein the composition is in the form of an aqueous paste before it is dispersed in water.

* * * * *